July 22, 1958  G. H. STEELE, JR  2,844,810
SAFETY EXIT ALERT FOR AUTOMOBILES
Filed March 2, 1956
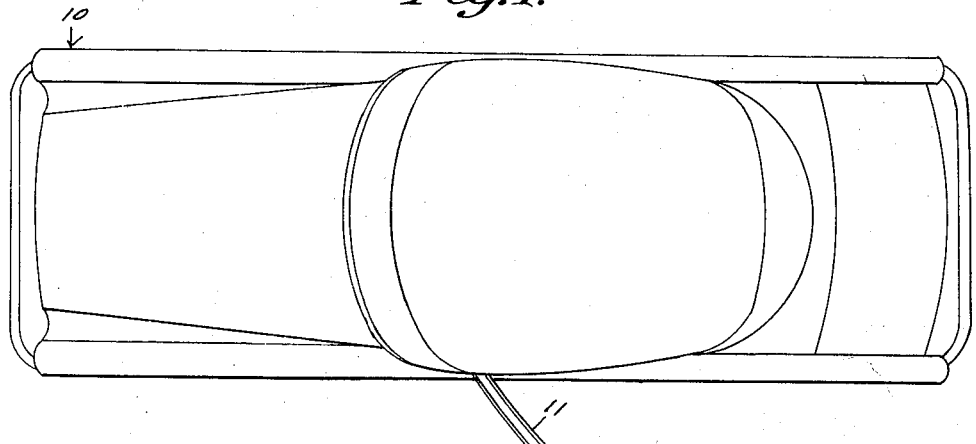
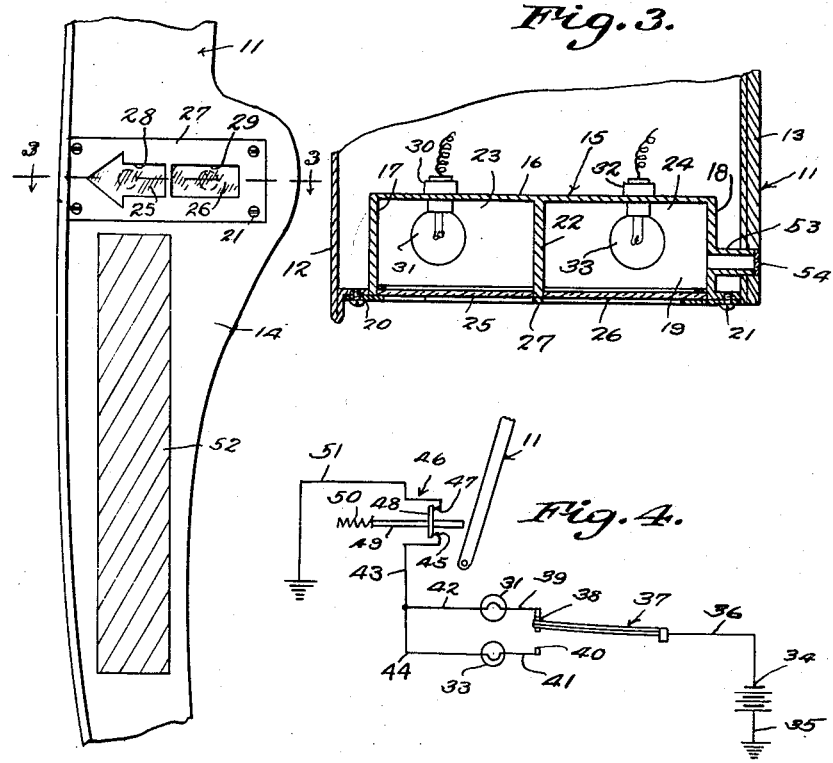
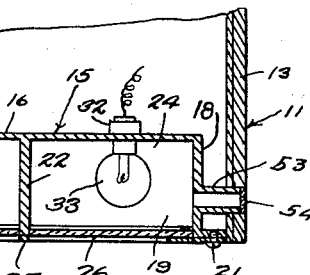
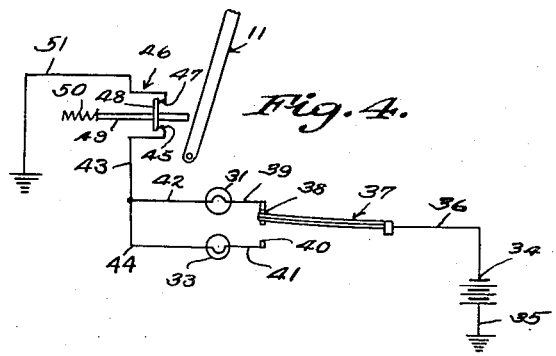
Gordon H. Steele, Jr.
INVENTOR
BY *Cathrow Leo*
ATTORNEYS.

2,844,810

SAFETY EXIT ALERT FOR AUTOMOBILES

Gordon H. Steele, Jr., Washington, D. C.

Application March 2, 1956, Serial No. 569,050

2 Claims. (Cl. 340—87)

This invention relates to a safety exit alert adapted for mounting in the free edge of a door of a vehicle.

An object of this invention is to provide a signal means in the form of a light which is automatically operated when the door on the driver's side of the vehicle is open.

A further object of this invention is to provide a safety means mounted in the free edge of a door whereby an approaching vehicle is alerted as to the opening of the door on the street side of the vehicle.

A further object of this invention is to provide in combination a signal or safety alerting means which is automatically operated upon opening of a vehicle door so as to signal an approaching vehicle as to the opening of the door, the device also including a reflector mounted in the free edge of the door for reflecting the head light of the approaching vehicle.

A further object of this invention is to provide a safety means of this kind which includes a pilot opening into the light housing so that the driver of the vehicle can determine whether the door is completely closed and the signal light cut off.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a plan view of a vehicle having a safety exit alert device mounted thereon constructed according to an embodiment of this invention.

Fig. 2 is a fragmentary end elevation of the door showing the safety device mounted thereon.

Fig. 3 is a sectional view taken on line 3—3 of Fig. 1.

Fig. 4 is a diagrammatic view showing the electric circuit embodied in this invention.

Referring to the drawing the numeral 10 designates generally a conventional vehicle having a door 11 hingedly secured thereon which is hinged at the forward edge and opens outwardly from the rear edge thereof. The door 11 is of a hollow construction embodying outer and inner walls 12 and 13, respectively, and the door 11 also includes an end wall 14 forming the free edge of the door.

In order to provide means whereby an approaching vehicle will be alerted as to the opening of the door 11, I have provided a light housing generally indicated at 15 which is mounted in the end wall 14 of the door 11. The housing 15 includes bottom wall 16, opposite end walls 17 and 18 and a pair of side walls 19. The housing 15 is formed with a marginal flange 20 whereby the housing 15 may be secured by fastening members 21 to the end wall 14 of the door 11. The housing 15 has an intermediate partition 22 disposed therein which divides the interior of the housing into a pair of light compartments 23 and 24. A transparent or translucent panel 25 is disposed on the outer end of the chamber 23 and a transparent or translucent panel 26 is disposed at the outer end of the chamber 24. An outer wall or plate 27 is secured to the outer end of the housing 15 and the plate 27 has an opening 28 cut out therefrom in the form of an arrow which in Fig. 2 points to the left. The plate 27 is also provided with a second opening 29 forming a window which permits light to pass outwardly from chamber 24. The opening 29 is formed as a substantial continuance of the arrow 28. The panels 25 and 26 may be of any suitable color.

A light socket 30 is secured to the bottom wall 16 in the chamber 23 and a light bulb 31 is mounted in the socket 30. A second light socket 32 is secured to the bottom wall 16 and a second light bulb 33 is mounted in socket 32 within chamber 24.

The light bulbs 31 and 33 are interposed in an electric circuit which includes a battery 34 having one side thereof connected as by conductor 35, to the ground. A conductor 36 is extended from the other side of battery 34 and a blinker or flasher switch member 37 is connected to conductor 34. The switch member 37 is preferably of bi-metallic construction and normally the switch member 37 engages a contact 38 which is connected by means of a conductor 39 to light bulb 31. A second contact 40 is disposed in a position to be engaged by switch member 37 and contact 40 is connected by means of a conductor 41 to one side of light bulb 33. Bulb 31 is connected by means of a conductor 42 to a common conductor 43 and bulb 33 is connected by means of a conductor 44 to conductor 43. Conductor 43 is connected to one contact 45 of a normally closed switch generally indicated at 46. The switch 46 is adapted to be mounted in the door frame and switch 46 includes a second contact 47. A bridging member 48 is carried by a stem 49 which is spring pressed by means of a spring 50 to switch closing position. The stem 49 extends outwardly beyond the bridging member 48 in a position to be engaged by door 11 when the door is closed. Contact 47 is connected by means of conductor 51 to the ground.

In order to provide means whereby the opening of the door 11 will give reflected light as an alert to an approaching vehicle the wall 14 of the door 11 has a reflecting plate 52 secured thereto whereby the light from an approaching vehicle will be reflected back to the vehicle. The reflector 52 may be in the form of a highly polished plate and if desired the reflector 52 may also have luminous material disposed thereon in the form of ribbons or the like which will be made luminous by contact of light rays therewith.

In order that the driver of the vehicle may determine whether the door 11 is completely closed and switch 46 in open position, a tubular extension 53, extends from end wall 18 and projects through inner wall 13 of the door 11. A transparent or translucent panel 54 may close the outer end of the tube 53.

In the use and operation of this safety means the light housing 15 is mounted in the wall 14 of the door 11 and the switch 46 is secured in the door frame or if desired may be secured to the inner hinged edge of the door. When the door 11 is opened spring 50 will move switch 46 to a closed position and at this time the blinker switch 37 will be active so as to alternately connect light bulb 31 and light bulb 33 with the battery 34. By providing a blinker light whereby two or more lights are alternately operated, the driver of the approaching vehicle will be alerted as to the opening of the door and will not confuse the blinking lights with the tail light or other light which may be on the road.

In the event the door 11 is not completely closed and switch 46 is still in circuit closed position the driver of the vehicle can determine the condition of the switch by glancing at panel 54. If any light appears in panel 54 the driver will know that the inner light bulb 33 is lighted.

What is claimed is:

1. In a vehicle having a door adjacent the driver, a housing fixed in the free edge of the door, a pair of light bulbs in said housing, means connecting said light bulbs with a source of current supply, a spring closed switch in the frame of the vehicle at the hinged edge of said door interposed in said connecting means, a blinker switch also interposed in said connecting means connected to both of said bulbs for alternately lighting said bulbs when said door is opened and a sight tube projecting from said housing and extending through the inner side of said door.

2. In a vehicle having a door adjacent the driver, a housing fixed in the free edge of the door, a plurality of light bulbs in said housing, an electric circuit for each bulb, means in the door frame connected with said circuits for closing said circuits when the door is opened, means interposed in said circuits for alternately opening and closing said circuits and a sight tube projecting from said housing and extending through the inner side of said door.

References Cited in the file of this patent

UNITED STATES PATENTS

| | | |
|---|---|---|
| 1,943,440 | Horni | Jan. 16, 1934 |
| 2,265,095 | Adler | Dec. 2, 1941 |
| 2,677,752 | Kaiser | May 4, 1954 |